US005751542A

United States Patent [19]

Holhammar

[11] Patent Number: 5,751,542

[45] Date of Patent: May 12, 1998

[54] WALL SOCKET

[75] Inventor: Jörgen Holhammar, Lindome, Sweden

[73] Assignee: Vattenfall AB, Stockholm, Sweden

[21] Appl. No.: 737,791

[22] PCT Filed: May 24, 1995

[86] PCT No.: PCT/SE95/00596

§ 371 Date: Nov. 25, 1996

§ 102(e) Date: Nov. 25, 1996

[87] PCT Pub. No.: WO95/33288

PCT Pub. Date: Dec. 7, 1995

[30] Foreign Application Priority Data

May 26, 1994 [SE] Sweden ................................. 9401802

[51] Int. Cl.[6] ................................ H02B 1/10; H02B 1/18

[52] U.S. Cl. .......................... 361/623; 363/146; 361/690; 439/535

[58] Field of Search ............................ 200/51 R; 174/53; 363/146; 336/61, 90, 107, 174, 175, 198, 208; 439/107, 166, 173, 485, 535, 620; 361/600–603, 622, 623, 641, 643, 678, 690, 692, 707, 723, 733

[56] References Cited

U.S. PATENT DOCUMENTS

| | | | |
|---|---|---|---|
| 3,813,579 | 5/1974 | Doyle | 317/188 |
| 4,273,406 | 6/1981 | Okagami . | |
| 4,843,298 | 6/1989 | Brauch | 320/2 |
| 5,159,545 | 10/1992 | Lee | 363/146 |
| 5,281,154 | 1/1994 | Comerci et al. . | |
| 5,301,494 | 4/1994 | Peot | 320/2 |

FOREIGN PATENT DOCUMENTS

| | | |
|---|---|---|
| 0 281 969 A2 | 9/1988 | European Pat. Off. . |
| 0 409 226 A2 | 1/1991 | European Pat. Off. . |
| 0 493 080 A2 | 7/1992 | European Pat. Off. . |

*Primary Examiner*—Gerald P. Tolin
*Attorney, Agent, or Firm*—Burns, Doane, Swecker & Mathis, L.L.P.

[57] ABSTRACT

A wall socket is adapted to be flush-mounted in a wall terminal box. The base of the wall socket comprises a base portion, which is flush-mounted in the wall terminal box and supports connector terminals for an alternating voltage available in the wall terminal box, as well as a surface-mounted base portion, which is located outside, and is laterally offset in relation to the opening of the wall terminal box and which supports at least one low-voltage socket (31) for a direct voltage. A surface-mounted cover (40) encloses not only the opening of the wall terminal box (10) but also the surface-mounted and laterally-offset base portion, and further is formed with one or more openings giving access to the low-voltage socket. A transformer and rectifier element arranged in the wall terminal box has an alternating voltage side for connection to the alternating voltage, as well as a direct-voltage side for emitting step-down transformed and rectified voltage to the low-voltage socket (31).

20 Claims, 2 Drawing Sheets

WALL SOCKET

Figure 1:
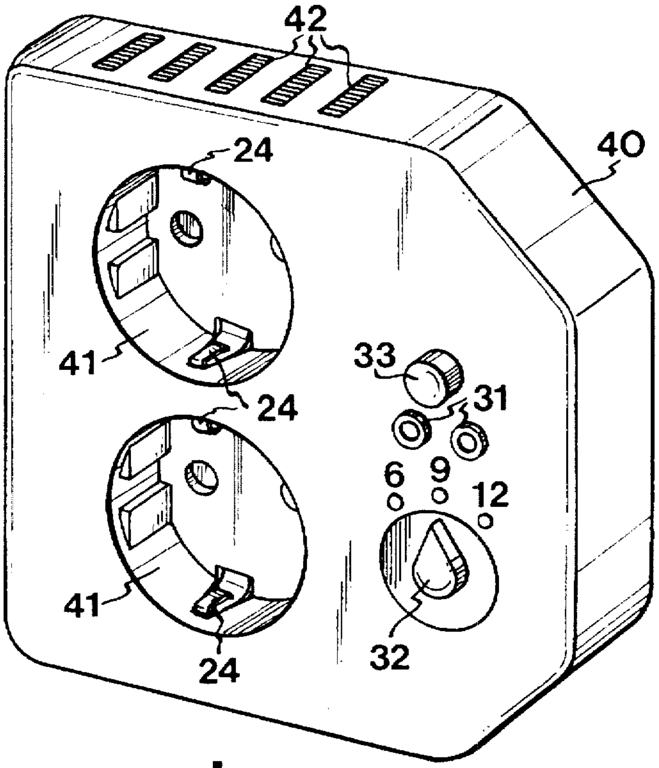

This invention generally concerns a wall socket adapted to be flush-mounted in a wall terminal box, as set forth in the preamble to appended claim 1.

Many electronic appliances, such as CD players, telephones, tape recorders and medical apparatus, are designed to be operated at a fairly low direct voltage, such as 6V, 9V and 12V. Normally, this direct voltage can be supplied either from batteries or from a suitable transformer and rectifier element connected to an existing alternating-current mains of e.g. 220V. In most cases, the transformer and rectifier element is arranged in a compact housing or cover along with any additional electronic components, such as a smoothing capacitor, in order to form a separate adapter. The primary side of the transformer is electrically connected to contact pins projecting from the adapter housing and enabling the adapter to be connected to an ordinary 220V wall socket like a plug. The rectified low voltage on the secondary side of the transformer is connected to a power supply line for the apparatus to be operated. Prior-art adapters may further comprise a thermal fuse and, optionally, a switch for different output voltages.

However, such known adapters suffer from a number of drawbacks. First, each adapter is often designed to suit a specific apparatus, there being no standards. It goes without saying that this entails undesirably high costs as well as low flexibility, since a new adapter has to be acquired for each new apparatus.

Second, most adapters have such large physical dimensions as to block not only the respective sockets to which they are connected, but also one or more adjoining sockets, which thus cannot be used for ordinary plugs.

Third, the individual adapter has to be removed from the wall socket in order to accompany the apparatus every time this is moved, which not only is inconvenient but entails a risk of the adapter being lost.

It has previously been suggested, for instance in EP-A2-0,493,080 and U.S. Pat. No. 4,273,406, to design an adapter essentially in the form of a conventional, albeit slightly enlarged, plug so that the adapter will not block any adjoining sockets when put to use. It is true that this known adapter obviates one of the drawbacks mentioned above, but this prior-art solution with an adapter integrated with a plug still involves an undesirable extra cost when new apparatus are acquired and actually mates it even more difficult to use existing adapters with new apparatus, since such plugs with integrated adapters normally are fixedly connected to the respective apparatus by a wire.

This invention aims at obviating the above drawbacks of the prior-art technique and, to this end, provides a completely new type of wall socket as set forth in appended claim 1.

The invention thus provides a wall socket which is adapted to be flush-mounted in a wall terminal box and which, when mounted, in known manner comprises a cover located outside the wall terminal box and a base located inside the wall terminal box and supporting at least one pair of connector terminals for receiving a plug via openings in the cover and for connection to an alternating voltage available in the wall terminal box. The wall socket according to the invention is characterised in that the base, apart from the base portion flush-mounted in the wall terminal box and supporting the connector terminals for the alternating voltage, comprises a surface-mounted base portion which is located outside, and is laterally offset in relation to, the opening of the wall terminal box facing the cover and which supports at least one low-voltage socket for a direct voltage. The surface-mounted cover has such an extent as to enclose the opening of the wall terminal box as well as the laterally-offset, surface-mounted base portion, and further is formed with one or more openings giving access to the low-voltage socket. Furthermore, the wall socket comprises a transformer and rectifier element which is dish posed in the wall terminal box and is connected to the flush-mounted base portion and which has an alternating-voltage side for connection to the alternating voltage, as well as a direct-voltage side for emitting a step-down transformed and rectified voltage to the low-voltage socket.

According to the invention, the equipment providing low voltage is thus transferred from the conventional loose adapter to a stationary installation, which in addition may be integrated with a conventional electrical installation. Existing 220V alternating-current sockets are easily modified in accordance with the invention, enabling access to both the conventional 220V alternating voltage and a rectified low voltage at one and the same socket.

The inventive wall socket is further distinguished by the fact that some of its electrical components, namely the components giving access to the rectified low voltage, are disposed outside the wall terminal box, i.e. outside the body of the wall, while at the same time all high voltage is, in known fashion, kept inside the body of the wall within the wall terminal box. In this way, safety is in no way jeopardised.

Another distinctive feature of the inventive wall socket is that the cover is laterally "extended" in relation to the opening of the wall terminal box, so as to cover the surface-mounted low-voltage portion of the base, The part of the cover that is located opposite to the wall terminal box and covers the flush-mounted high-voltage portion of the base may be designed in known fashion in accordance with existing safety regulations regarding child proofness and so forth In one preferred embodiment of the invention, the wall socket is, in a manner known per se, equipped with an annular mounting flange, preferably made of metal, disposed between the front edge of the wall terminal box and the cover. This mounting flange supports the base and is intended to be fastened by screws to the outer edge of the wall terminal box before the cover is mounted. In this embodiment of the invention, the base comprises a connecting element extending through the central opening of the annular mounting flange and connecting the flush-mounted high-voltage portion of the base to its surface-mounted low-voltage portion This connecting element of the base may thus support electrical connections between the transformer and rectifier element provided inside the wall terminal box and the low-voltage components provided on the outside thereof. The annular mounting flange may be laterally extended so as to extend behind the surface-mounted low-voltage base portion and support it.

The wall socket according to the invention may be equipped with a number of additional functions. For instance, the low-voltage portion may be provided with a switching function for different low voltages, a manually accessible switch being arranged in that part of the front of the cover which covers the low-voltage base portion. There may further be provided an indicating element, such as a light-emitting diode, adjacent to the low-voltage portion in order to indicate the function of the low-voltage sockets, for instance by emitting a green light when low-voltage connectors are connected to the low-voltage sockets. The wall socket may also be supplemented with a thermal current limiter, which is triggered when the apparatus connected to the low voltage draws too much current. Triggering of the current limiter may then be indicated by the above indicating element, for instance by switching on a red light-emitting diode.

If need be, the cover may be provided with cooling slots, for instance at its periphery, for abstracting heat generated by the transformer in the wall terminal box.

Figure 2:
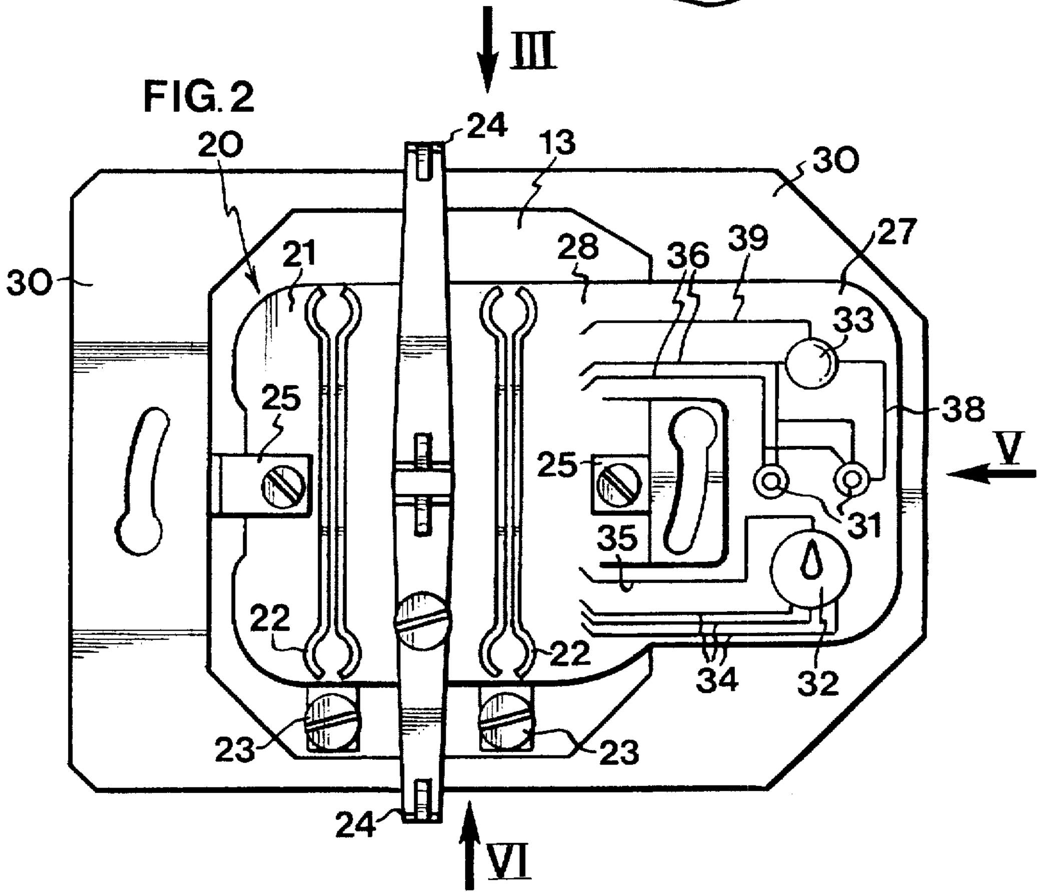
Figure 3:
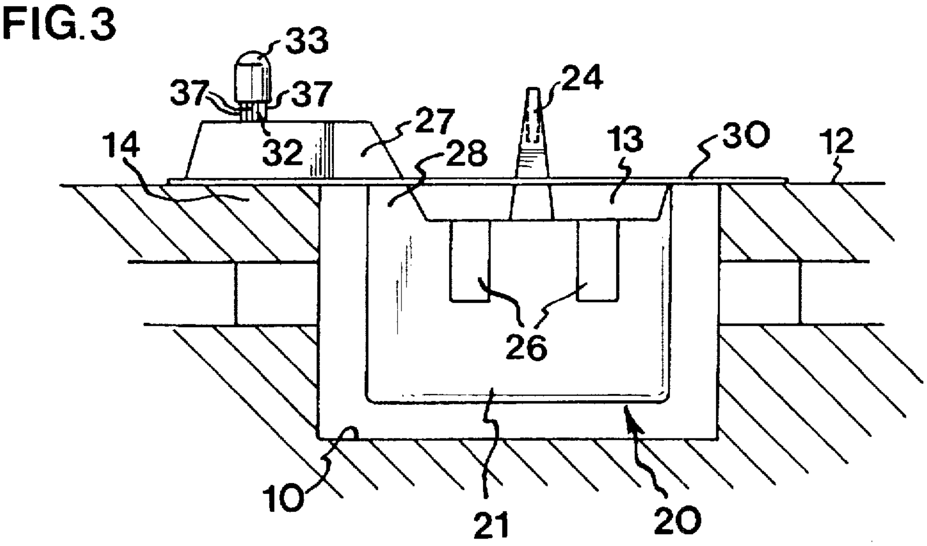
Figure 4:
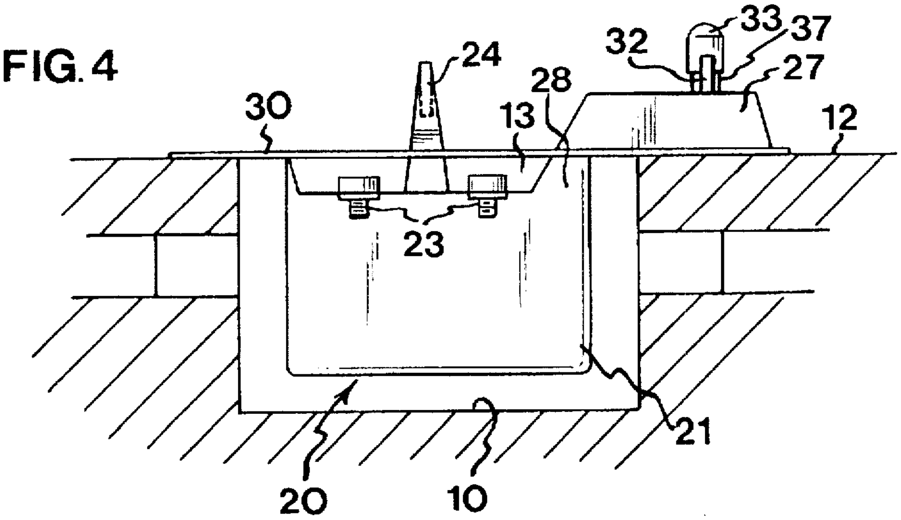
Figure 5:
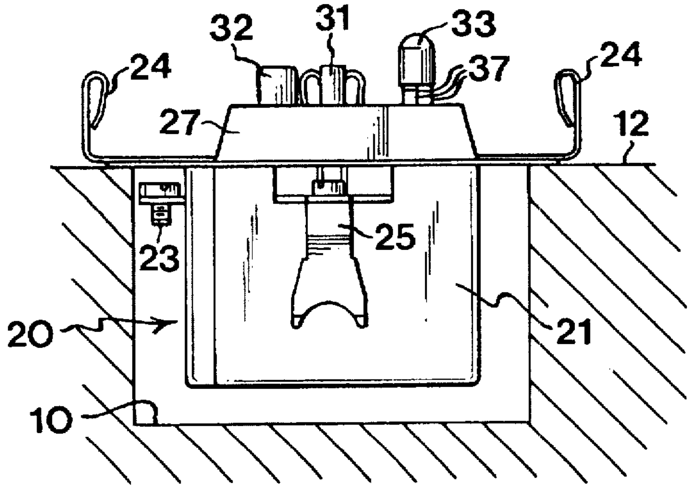

These and other distinctive features and advantages of the invention will appear from the following detailed description of one embodiment of the invention, reference being made to the accompanying drawings, in which FIG. 1 is a perspective front view of an embodiment of the wall socket according to the invention, FIG. 2 is a front view of the wall socket in FIG. 1, the cover having been removed, FIG. 3 is a side view taken in the direction indicated by the arrow III in FIG. 2, the socket being arranged in a flush-mounted wall terminal box, FIG. 4 is a side view taken in the direction indicated by the arrow IV in FIG. 2, the socket being arranged in a flush-mounted wall terminal box, and FIG. 5 is a side view taken in the direction indicated by the arrow V in FIG. 2, the socket being arranged in a flush-mounted wall terminal box.

The illustrated socket is what is generally known as a flush-mounted wall socket, which is intended to be mounted in a cylindrical wall terminal box 10 that is flush-mounted in the body of a wall 12. As a rule, the wall terminal box has a depth of about 40 mm and a diameter of about 70 mm. Alternating voltage of e.g. 220V is assumed to be available in the wall terminal box 10 via openings (not shown) in its peripheral wall. The wall socket itself comprises three main components, namely a base 20, which is made of bakelite or the like and is arranged in the wall terminal box 10 to support the electrical components of the socket, a flat annular metal flange 30, which is connected to the base 20 and is adapted to be clamped against the front edge of the wall terminal box 10, and a protective cover 40, which is arranged outside the body of the wall 12 and, in this embodiment, is formed with access openings 41 for two plugs (not shown).

The base 20 comprises an inner portion 21, which in its entirety is located inside the wall terminal box 10 at a distance from the inner wall thereof and in known fashion supports a number of connector terminals 22, which are connected to the 220V alternating voltage (connection screws 23) and are adapted to receive pairs of contact pins of a plug. There are further provided earthing terminals 24, as well as known brackets 25 for clamping the inner base portion 21 against the inner wall of the wall terminal box 10.

In the embodiment illustrated, the inner base portion 21 is formed integral with a transformer and rectifier element, which is not shown in the Figures since it is embedded in the base portion 21 proper. This embedded element further includes a smoothing capacitor provided on the output side of the rectifier, and a thermal current limiter. If need be, a voltage-stabilising circuit may also form part of this element. There are further provided contact plates 26, which interconnect the 220V connector terminals 22 and the primary side of the transformer. On its secondary side, the transformer emits three separate direct voltages of 6V, 9V and 12V after rectification and smoothing.

The base 20 further comprises an outer portion 27, which is formed integral with the inner base portion 21 and is connected thereto by a connecting element 28, which extends through a central opening 13 in the mounting flange 30.

As shown in FIGS. 3 and 4, the outer base portion 27 is located outside the body 12 of the wall and is laterally offset in relation to the opening 13 of the wall terminal box 10. Thus, the outer base portion 27 is located by a surface area 14 of the wall which is found beside the wall terminal box 10 and is not used in the case of conventional wall sockets.

At the front of the outer base portion 27, there are provided two low-voltage sockets 31 of standard type (1.9 mm thick central pin according to European standards), a manually adjustable rotary switch 32, as well as a light-emitting diode 33. The rotary switch 32 receives the three different direct voltages of 6V, 9V and 12V through wires 34, which are supported by or embedded in the base 20. The low voltage manually selected with the aid of the rotary switch 32 is available through a wire 35 and is, through wires 36, fed to the low-voltage sockets 31.

The light-emitting diode 33 has three connecting branches 37 and may emit green or red light, as a function of the voltage applied. In the illustrated embodiment, the light-emitting diode 33 is switched on via a wire 38 so as to shine with a green light when current is drawn from the direct-voltage sockets 31. If the current limiter is triggered, the light-emitting diode 31 will be so controlled via a wire 39 as to shine with a red light.

The cover 40 is formed with the access openings required for the low-voltage sockets 31, the switch 32 and the light-emitting diode 33. Furthermore, the cover 40 is, at its upper and lower periphery, provided with a number of throughgoing ventilation slots 42 for abstracting the heat generated by the transformer. Moreover, the cover 40 is suitably equipped with conventional screw holes (not shown) for the mounting on the base.

It will be appreciated that the construction described above in no way Impairs the safety of conventional 220V sockets, since it is only the low-voltage socket portion that is located outside the flush-mounted wall terminal box. Thus, the high-voltage base portion 21 is still flush-mounted in the wall terminal box 10 and is therefore as safely arranged as in prior-art wall sockets.

Furthermore, it is to be understood that the invention is advantageous in that the alternating-voltage socket is not blocked when access is needed to the rectified low voltage, which is in contradistinction to prior-art adapters, which block at least the alternating-voltage sockets in which they are inserted.

It goes without saying that the embodiment described above may be modified in many ways within the scope of the appended claims. For instance, both the switch 32 and the light-emitting diode 33 can be dispensed with. If the switching function is left out, use can be made of a simpler and less expensive transformer.

I claim:

1. A wall socket which is adapted to be flush-mounted in a wall terminal box (10) and which, when mounted, comprises a cover (40) located outside the wall terminal box (10) and a base (20) located inside the wall terminal box (10) end supporting at least one pair of connector terminals (22) for receiving a plug via openings (41) in the cover and for connection to an alternating voltage available in the wall terminal box (10), characterised in that the base (20) comprises a base portion (21), which is flush-mounted in the wall terminal box (10) and supports the connector terminals (22) for the alternating voltage, as well as a surface-mounted base portion (27), which is located outside, and is laterally offset in relation to, the opening (13) of the wall terminal box (10) facing the cover (40) and which supports at least one low-voltage socket (31) for a direct voltage, the surface-mounted cover (40) has such an extent as to enclose the opening of the wall terminal box (10) as well as the laterally-offset, surface-mounted base portion (27), and is formed with one or more openings giving access to the low-voltage socket, and the wall socket further comprises a transformer and rectifier element which is disposed in the wall terminal box (10) and is connected to the flush-mounted base portion (21) and which has an alternating-voltage side for connection to the alternating voltage, as well as a direct-voltage side for emitting a step-down transformed and rectified voltage to the low-voltage socket (31).

2. A wall socket as set forth in claim 1, characterised in that the flush-mounted base portion (21) and the surface-mounted base portion (27) are formed integral with each other via a connecting element (28) of the base (20), said connecting element (28) supporting electric conductors (34, 35, 36, 39) for feeding said low voltage from the transformer and rectifier element to the low-voltage socket (31).

3. A wall socket as set forth in claim 1, characterised in that the transformer and rectifier element is embedded in the flush-mounted base portion (21).

4. A wall socket as set forth in claim 1, characterised in that the surface-mounted base portion (27) supports a switch (32) which is accessible from the outside of the cover (40) and is manually adjustable to different positions corresponding to different voltage levels of the rectified low voltage.

5. A wall socket as set forth in claim 1, characterised in that the surface-mounted base portion (27) supports an indicating element, such as a light-emitting diode (33), which is visible on the outside of the cover (40) and is adapted to indicate whether current is being drawn from the low-voltage sockets (31).

6. A wall socket as set forth in claim 1, characterised in that there is provided a current limiter which is triggered when an impermissibly high current intensity is drawn from the low-voltage sockets (31), and that the surface-mounted base portion (27) supports an indicating element, such as a light-emitting diode (33), which is visible on the outside of the cover (40) and is adapted to indicate whether the current limiter has been triggered.

7. A wall socket as set forth in claim 1, which further comprises a flat annular mounting flange (30), which supports the flush-mounted base portion (21) and is adapted to be fixed to the front edge of the wall terminal box (10), characterised in that the mounting flange (30) has a laterally extended portion behind the surface-mounted base portion (27).

8. A wall socket as set forth in claim 1, characterised in that the cover (40) comprises one or more ventilation slots (42) or the like for abstracting heat generated by the transformer and rectifier element.

9. A wall socket as set forth in claim 2, characterized in that the transformer and rectifier element is embedded in the flush-mounted base portion (21).

10. A wall socket as set forth in claim 2, characterized in that the surface-mounted base portion (27) supports a switch (32) which is accessible from the outside of the cover (40) and is manually adjustable to different positions corresponding to different voltage levels of the rectified low voltage.

11. A wall socket as set forth in claim 3, characterized in that the surface-mounted base portion (27) supports a switch (32) which is accessible from the outside of the cover (40) and is manually adjustable to different positions corresponding to different voltage levels of the rectified low voltage.

12. A wall socket as set forth in claim 9, characterized in that the surface-mounted base portion (27) supports a switch (32) which is accessible from the outside of the cover (40) and is manually adjustable to different positions corresponding to different voltage levels of the rectified low voltage.

13. A wall socket as set forth in claim 2, characterized in that the surface-mounted base portion (27) supports an indicating element, such as a light-emitting diode (33), which is visible on the outside of the cover (40) and is adapted to indicate whether current is being drawn from the low-voltage sockets (31).

14. A wall socket as set forth in claim 3, characterized in that the surface-mounted base portion (27) supports an indicating element, such as a light-emitting diode (33), which is visible on the outside of the cover (40) and is adapted to indicate whether current is being drawn from the low-voltage sockets (31).

15. A wall socket as set forth in claim 2, characterized in that there is provided a current limiter which is triggered when an impermissibly high current intensity is drawn from the low-voltage sockets (31), and that the surface-mounted base portion (27) supports an indicating element, such as a light-emitting diode (33), which is visible on the outside of the cover (40) and is adapted to indicate whether the current limiter has been triggered.

16. A wall socket as set forth in claim 3, characterized in that there is provided a current limiter which is triggered when an impermissibly high current intensity is drawn from the low-voltage sockets (31), and that the surface-mounted base portion (27) supports an indicating element, such as a light-emitting diode (33), which is visible on the outside of the cover (40) and is adapted to indicate whether the current limiter has been triggered.

17. A wall socket as set forth in claim 2, which further comprises a flat annular mounting flange (30), which supports the flush-mounted base portion (21) and is adapted to be fixed to the front edge of the wall terminal box (10), characterized in that the mounting flange (30) has a laterally extended portion behind the surface-mounted base portion (27).

18. A wall socket as set forth in claim 3, which in a manner known per se further comprises a flat annular mounting flange (30), which supports the flush-mounted base portion (21) and is adapted to be fixed to the front edge of the wall terminal box (10), characterized in that the mounting flange (30) has a laterally extended portion behind the surface-mounted base portion (27).

19. A wall socket as set forth in claim 2, characterized in that the cover (40) comprises one or more ventilation slots (42) or the like for abstracting heat generated by the transformer and rectifier element.

20. A wall socket as set forth in claim 3, characterized in that the cover (40) comprises one or more ventilation slots (42) or the like for abstracting heat generated by the transformer and rectifier element.

* * * * *